United States Patent
Braun et al.

(10) Patent No.: US 8,082,521 B2
(45) Date of Patent: Dec. 20, 2011

(54) DVD CHANGER UX

(75) Inventors: David A. Braun, Redmond, WA (US);
Hugh C. Vidos, Sammamish, WA (US);
Kort D. Sands, Seattle, WA (US);
Matthew Goyer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 965 days.

(21) Appl. No.: 11/297,381

(22) Filed: Dec. 9, 2005

(65) Prior Publication Data

US 2007/0133946 A1  Jun. 14, 2007

Related U.S. Application Data

(60) Provisional application No. 60/707,153, filed on Aug. 11, 2005.

(51) Int. Cl.
*G06F 3/048* (2006.01)
*H04N 9/80* (2006.01)

(52) U.S. Cl. .................................. 715/810; 386/241

(58) Field of Classification Search .................. 386/46, 386/95, 239–241, 278, 282; 455/556, 566; 715/810, 835
See application file for complete search history.

(56) References Cited

U.S. PATENT DOCUMENTS

| | | | |
|---|---|---|---|
| 5,631,882 A | 5/1997 | Mascenik | |
| 5,657,301 A | 8/1997 | Yoshikawa et al. | |
| 6,118,450 A * | 9/2000 | Proehl et al. | 715/810 |
| 6,131,129 A | 10/2000 | Ludtke et al. | |
| 6,147,940 A | 11/2000 | Yankowski | |
| 6,356,971 B1 | 3/2002 | Katz et al. | |
| 2002/0070982 A1* | 6/2002 | Hill et al. | 345/835 |
| 2002/0151327 A1* | 10/2002 | Levitt | 455/556 |
| 2004/0044724 A1* | 3/2004 | Bell et al. | 709/203 |
| 2006/0010395 A1* | 1/2006 | Aaltonen | 715/779 |
| 2006/0161928 A1 | 7/2006 | Douglass et al. | |
| 2006/0280050 A1 | 12/2006 | Miles et al. | |
| 2007/0133362 A1 | 6/2007 | Braun | |

OTHER PUBLICATIONS

USPTO Nonfinal Office Action mailed Feb. 20, 2009, in U.S. Appl. No. 11/297,404, filed Dec. 9, 2005.
USPTO Nonfinal Office Action mailed Jun. 25, 2008, in U.S. Appl. No. 11/297,404, filed Dec. 9, 2005.
USPTO Notice of Allowance mailed Sep. 1, 2009, in U.S. Appl. No. 11/297,404, filed Dec. 9, 2005.
USPTO Notice of Allowance mailed Jan. 11, 2010, in U.S. Appl. No. 11/297,404, filed Dec. 9, 2007.

* cited by examiner

*Primary Examiner* — Thai Tran
*Assistant Examiner* — Mishawn Dunn
(74) *Attorney, Agent, or Firm* — Shook Hardy Bacon LLP

(57) ABSTRACT

A user experience for displaying and organizing content available on discs in an external media changer is provided. A media content organizer for identifying discs, retrieving supplemental information, and presenting a display of the discs and disc information is also provided.

19 Claims, 5 Drawing Sheets

DVD CHANGER UX

CROSS-REFERENCE TO RELATED APPLICATIONS

This application claims the benefit of U.S. Provisional Application No. 60/707,153 filed on Aug. 11, 2005.

STATEMENT REGARDING FEDERALLY SPONSORED RESEARCH OR DEVELOPMENT

Not applicable.

BACKGROUND

Digital Versatile Discs (DVDs) provide a convenient format for storage of large data collections, such as movies. A variety of DVD playback devices are commercially available, including devices that have disc changers capable of storing dozens or hundreds of discs. A desired disc within a changer can be selected for playback on a television or other video display connected to the playback device. The DVD playback device is typically controlled using remotes or keypads that are dedicated to the playback device, with control information being provided on the connected video display.

Conventional computer systems often include one, or possibly a few, DVD playback devices contained within the computer housing. Such playback devices are typically dedicated devices for use in a computer. These dedicated devices can be controlled within the computer operating system, and playback of a DVD can be accomplished using the video monitor for the computer. The number of DVD discs and/or playback devices which can be contained within the computer is limited, however, by factors such as the size of the computer housing and the ability of an operating system to uniquely identify a device.

SUMMARY

In various embodiments, a system and method are provided for allowing a computer to control an external DVD playback device. The system and method allow control of the external DVD playback device while requiring little or no additional or specialized equipment.

In another embodiment, an interface and user experience for allowing a computer to control an external media changer and playback device are provided. The interface allows a user to select a disc within the changer, view details about a movie or other content contained on the disc, and load the disc for playback on the computer's video monitor or other display device. The discs within the external changer can be presented to the user in a gallery of DVD's that are available for playback. In an embodiment, the gallery can also include detailed information about some or all of the available discs, such as the cover art for the DVD or a movie synopsis.

In still another embodiment, application program interfaces for controlling an external media changer are provided. The application program interfaces allow an external media changer to be controlled using a computer, including identifying the discs within the media changer and playing back the content of a DVD on the display or monitor for the computer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

I. Overview

Figure 1:
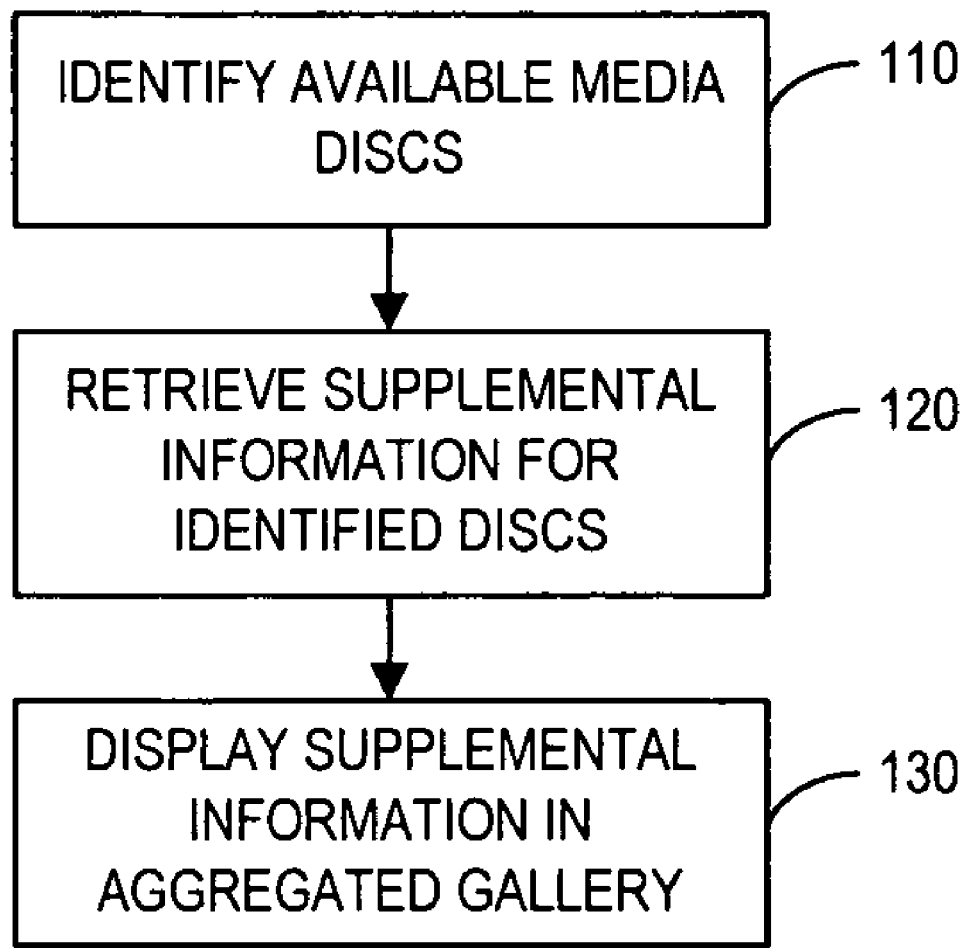
FIG. 1 is a block diagram illustrating a method in accordance with an embodiment of the invention.

In an embodiment, the invention provides an integrated method and system that allows a user to control an external media changer and playback device using a computer. The system and method allow the changer to be controlled from the computer, including loading and unloading of DVD's. Any media content on a DVD can be displayed on the computer's video display device.

In another embodiment, DVD's available in the external media changer can be displayed in a gallery along with other DVD's located in the computer, such as DVD's in a playback device or changer within the computer or DVD's that have been legally copied and stored on a storage drive. When the DVD's are displayed in the gallery, additional information about movies stored on the discs can be provided to the user, such as the cover art for the DVD or a movie synopsis. To obtain the additional information, the identity of the discs available to the user is determined. The disc identity is then used to retrieve the additional information from a database, such as a third party data providing service.

In still another embodiment, an application program interface enabling control of the external changer and playback device is provided.

II. Identifying and Browsing Available DVD's

In an embodiment, DVD's and/or CD's available for viewing on a computer can be displayed to a user in a single gallery. In such an embodiment, the number of available discs is first identified. This can be done by checking each location for a disc in one or more connected internal or external disc changers, disc drives, or other disc storage and/or disc playback devices. Additionally, other storage devices, such as an internal hard drive, can be checked to see if a DVD has been copied in its entirety to the storage device. Preferably, such copied DVD's can be located in one or more predetermined directories in the storage device. Each disc can then be checked to identify the disc type. In an embodiment, a disc can be a DVD, an audio CD, a data CD, a blank DVD or CD, or an unknown or unreadable disc. The disc type for a disc can be determined by any convenient method. For example, in an embodiment, the disc type for a disc in a drive can be determined by scanning the disc. For a disc in a storage slot, the disc can be moved to a drive and then scanned. Alternatively, a disc can be scanned for determination of the disc type when it is first inserted into a media changer. In another embodiment, a request to perform disc identification on one or more discs can be sent by a controlling computer, possibly in response to an action by a user of the computer. The disc slots or drives that do not contain a disc can also be identified as empty. The disc type can then be stored for each available disc slot or drive.

Once the disc type for a disc location is known, the disc can be scanned to determine one or more identifiers for the disc. Preferably, identifying information is determined for at least any available DVD's that are present in a DVD storage or playback device. In an embodiment, the identifying information can be a title or name for the disc. In another embodiment, other types of information may be directly available to identify the disc, such as a serial number. In still another embodiment, an identifier for a disc can be calculated by reading an initial amount of information from the disc and manipulating the information to create an identifier. For example, header information for a DVD disc can be used as input for a hash function to generate a numerical identifier.

After determining an identifier for some or all of the available discs, supplemental information can be retrieved for each disc having an identifier. The supplemental information can include a variety of information that is not typically available from an initial scan of a DVD or other disc. In an embodiment, the supplemental information can include a movie title, cover art for the DVD, release date for the movie, a plot summary, the MPAA rating, a review or rating for the movie, names of the movie chapters on the DVD, names of actors in the movie, and/or various other types of information related to the DVD content.

In an embodiment, supplemental information about a DVD movie disc or other disc can be retrieved from an external source. To retrieve the data, one or more of the identifiers determined for the disc is forwarded to a service that provides supplemental information. Preferably, a hash value based on the disc that uniquely identifies the disc is provided to the service provider. The service provider identifies the desired supplemental information based on the one or more identifiers and returns the information to the user. An example of a third party service provider that provides media information is WMIS. Note that supplemental information can also be retrieved for DVD movies stored in storage devices other than a media changer or playback device, as long as the one or more identifiers are available and associated with the movie. For example, an appropriate hash function identifier for a DVD movie can be manually associated with a movie stored on a hard drive by the user. Once supplemental information has been retrieved for a particular disc, some or all of the supplemental information can be stored locally.

After retrieving supplemental information for the identified discs, at least a portion of the supplemental information can be used to provide a gallery or other display format for the user to browse available DVD movies. In an embodiment, the supplemental information includes at least a title for the movie and the cover art for the DVD. The title, cover art, and/or other supplemental information can then be aggregated to form a gallery of available DVD movie choices. For example, the title and cover art for each available movie can be displayed in a gallery. Note that the number of selections in the gallery may result in the movies being displayed in a scrolling format. This allows the cover art and title to be displayed at a size that is easily viewed while still providing all of the available movies. Alternatively, the gallery can be displayed as a series of gallery screens that the user can move between, with each gallery screen containing a subset of the available movies. If no supplemental information is available for a DVD, the DVD can be displayed in the gallery using a default icon, or the DVD can be omitted from the gallery.

In an embodiment, the cover art and/or the title in the gallery can be configured as menu links to additional actions that the user can perform with a movie, such as playing the movie or viewing more information about the DVD. For example, the cover art can be configured as a link to take the user to a separate screen, such as a second-level gallery, when activated. When the cover art is selected, the user is provided with a second type of display gallery, which includes additional portions of the supplemental information. In another embodiment, the supplemental information for a DVD or other disc can be organized into multiple layers. These multiple layers can be navigated in order to view the retrieved supplemental information.

In still another embodiment, a gallery such as the top level gallery can display cover art representing a group of related DVD's. For example, a season of shows for a television program can be stored on multiple DVD's. Rather than displaying each disc for the season as a separate item in the top level gallery, a single link (such as cover art for one of the discs) can be provided for all the related discs. The single link can be in the form of cover art for one of the discs, a title for one of the discs, or a generic title referring to the group of related discs. When the link is selected, a second level gallery can be provided showing all of the related discs. The user can then select an individual disc from this second level gallery to get supplemental information and/or playback the content of the disc.

In some embodiments, accessing the supplemental information for one or more discs may require retrieval of a portion of the supplemental information from an external source. Once supplemental information is retrieved from an external source, some or all of the supplemental information can be stored locally, such as in a cache file on the controlling computer. For example, once the cover art for a movie is retrieved, it can be stored locally on a computer for a fixed time period or for as long as a corresponding disc remains in the media changer. Alternatively, portions of the supplemental information can be retrieved each time the information is to be displayed.

The cover art and/or the second-level gallery can also have a link to allow playback of a DVD. Even though DVD may be located in an external disc drive or media changer, the playback of the DVD can take place on the computer using the computer's video display. For example, the playback can take place in a window on the computer display.

FIG. 1 provides an example of a method for browsing the available DVD's and other discs on a computer according to an embodiment of the invention. In the embodiment shown in FIG. 1, DVD's available to a computer via an external media changer are identified 110. Any other types of discs in the external media changer can also be identified. Additionally, DVD's in other locations, such as an internal or dedicated DVD drive in the computer can also be identified. Supplemental information is retrieved 120 regarding identified DVD's. The supplemental information can be retrieved just for DVD's in the external media changer, or the supplemental information can also be retrieved for DVD's available to the computer in other locations. After retrieving the supplemental information, at least a portion of the supplemental information for each DVD can be aggregated together for display 130 in a gallery.

Figure 2A:
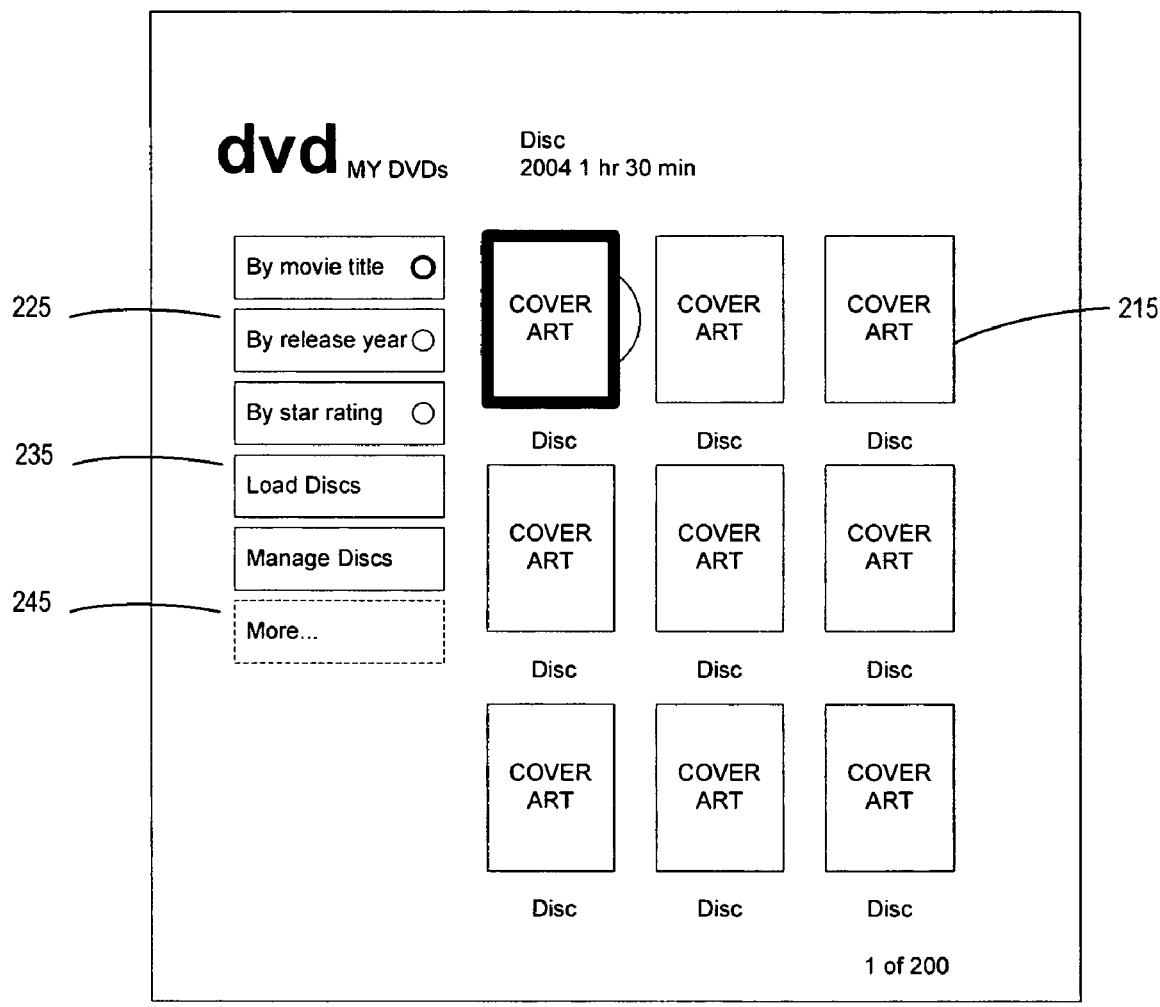
FIGS. 2a and 2b are examples of display galleries according to an embodiment of the invention.
Figure 2B:
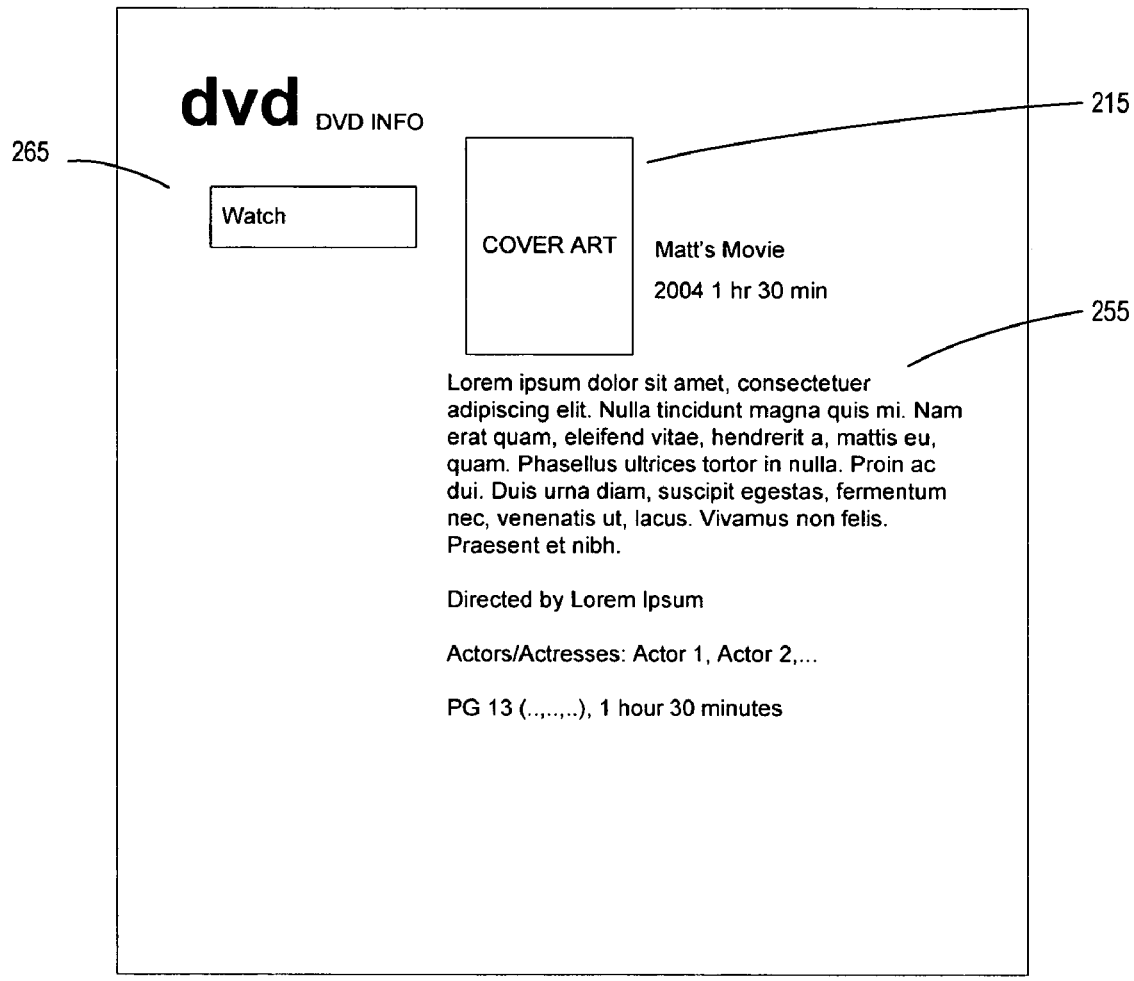

FIGS. 2a and 2b provide an example of galleries for displaying information about available discs according to an embodiment of the invention. In the embodiment depicted in FIG. 2a, a gallery is shown including cover art 215 for various available DVD's. In such an embodiment, each item of DVD cover art can serve as a navigation link for either viewing information about the disc and/or playing back the movie or other content on the disc. Additionally, the gallery can provide selection buttons 225 for performing various functions. Selection buttons are included for sorting the discs by title, movie review rating, or release year. Other sort buttons could also be included to allow sorting on other types of supplemental information, such as a movie category (action, romance, etc.) or MPAA rating. Buttons 235 are also provided to allow loading of new discs into a changer and for disc management. Still other buttons can be available on the gallery page, or a "More" button 245 can be provided to bring up an interface with additional actions.

FIG. 2b shows a gallery for displaying supplemental information about a single DVD. In an embodiment, a gallery such as the one shown in FIG. 2b is accessed by selecting a link on a higher or top level gallery page having the format of FIG. 2a. In FIG. 2b, supplemental information 255 that has been retrieved for the DVD is displayed along with a button 265 for beginning playback of the movie on the DVD.

In various embodiments, the methods of this invention can be carried out on any suitable computer that is connected to one or more external DVD (or other media) playback and/or storage devices, such as a home personal computer. The computer can include a bus or other communication mechanism for communicating information, which interconnects subsystems and devices, such as processors (e.g., CPU), system memory (e.g., RAM), storage devices (e.g., ROM), disk drives (e.g., magnetic or optical), communication interfaces (e.g., modem or Ethernet card), display (e.g., CRT or LCD), and input devices (e.g., keyboard, mouse, trackball, infrared or radio frequency emitter/receiver, or remote control). The disk drives can include one or more internal DVD playback devices. Preferably, the computer includes a remote control or other infrared or radio frequency controller configured to facilitate browsing and playback of movies.

In an embodiment, the computer performs specific operations by a processor executing one or more sequences of one or more instructions contained in system memory. Such instructions may be read into system memory from another computer readable medium, such as a static storage device or a disk drive. In alternative embodiments, hard-wired circuitry may be used in place of or in combination with software instructions to implement the invention.

The term "computer readable medium" refers to any medium that participates in providing instructions to a processor for execution. Such a medium may take many forms, including but not limited to non-volatile media and volatile media. Non-volatile media includes, for example, optical or magnetic disks. Volatile media includes dynamic memory.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge.

In an embodiment of the invention, execution of the sequences of instructions to practice the invention is performed by a single computer system. According to other embodiments of the invention, two or more computer systems coupled by a communication link (e.g., LAN, PSTN, or wireless network) may perform the sequence of instructions to practice the invention in coordination with one another. A computer system may transmit and receive messages, data, and instructions, including program, i.e., application code, through a communication link and a communication interface. Received program code may be executed by a processor as it is received, and/or stored in a disk drive or other non-volatile storage for later execution.

The computer can be connected to one or more external media playback, storage, or playback and storage devices. The external devices can be connected in any convenient manner, such as using a firewire or USB type connection. The external devices receive commands from the computer and provide information and/or the playback video feed to the computer via the connection.

In another embodiment, the invention provides a media content organizer. The media content organizer can include a media identification service for determining the number, type, and identifying information regarding any discs available to the organizer.

The media content organizer can also include a data retrieval service for retrieving supplemental information about available media. The data retrieval service receives media identification information from the media identification service. The media identification information is then used to retrieve supplemental information regarding the identified media. In an embodiment, the data retrieval service forwards the identification information to an outside service provider and then receives back the supplemental information. In another embodiment, the data retrieval service can use the identification information to query a database, such as an external or remote database, that contains the supplemental information.

Additionally, the media content organizer can include an aggregator for aggregating information about media contained in one or more external media sources, such as external DVD changers or drives. Data about media in other drives, such as an internal hard drive or an internal DVD drive can also be aggregated with the information about the external DVD drives.

The media content organizer can further include a media presentation service for displaying the media information that corresponds to the media content selection. Turning to the media presentation service of this embodiment, the media presentation displays media information that corresponds to the media content selection. The media presentation service also controls the operation of the external media source. The media presentation service works as a graphical interface. The graphical interface has a form of a media gallery. The computer automatically loads the graphical interface. Once the graphical interface is loaded, a user has the option to select from some or all of the available media content selections that were identified earlier by the computer. At this point, a user can choose a media content selection and view some or all of media information categories that corresponds to the media content selection. The media presentation service further provides a user the ability to navigate through pages of the graphical interface. The media presentation service also allows a user the ability to play the contents of the media content selection with visual and audio capabilities for a full multimedia experience.

In still another embodiment, the media content organizer can include a navigator to allow the user to browse available DVD's and navigate through supplemental information using a graphical user interface.

Figure 3:
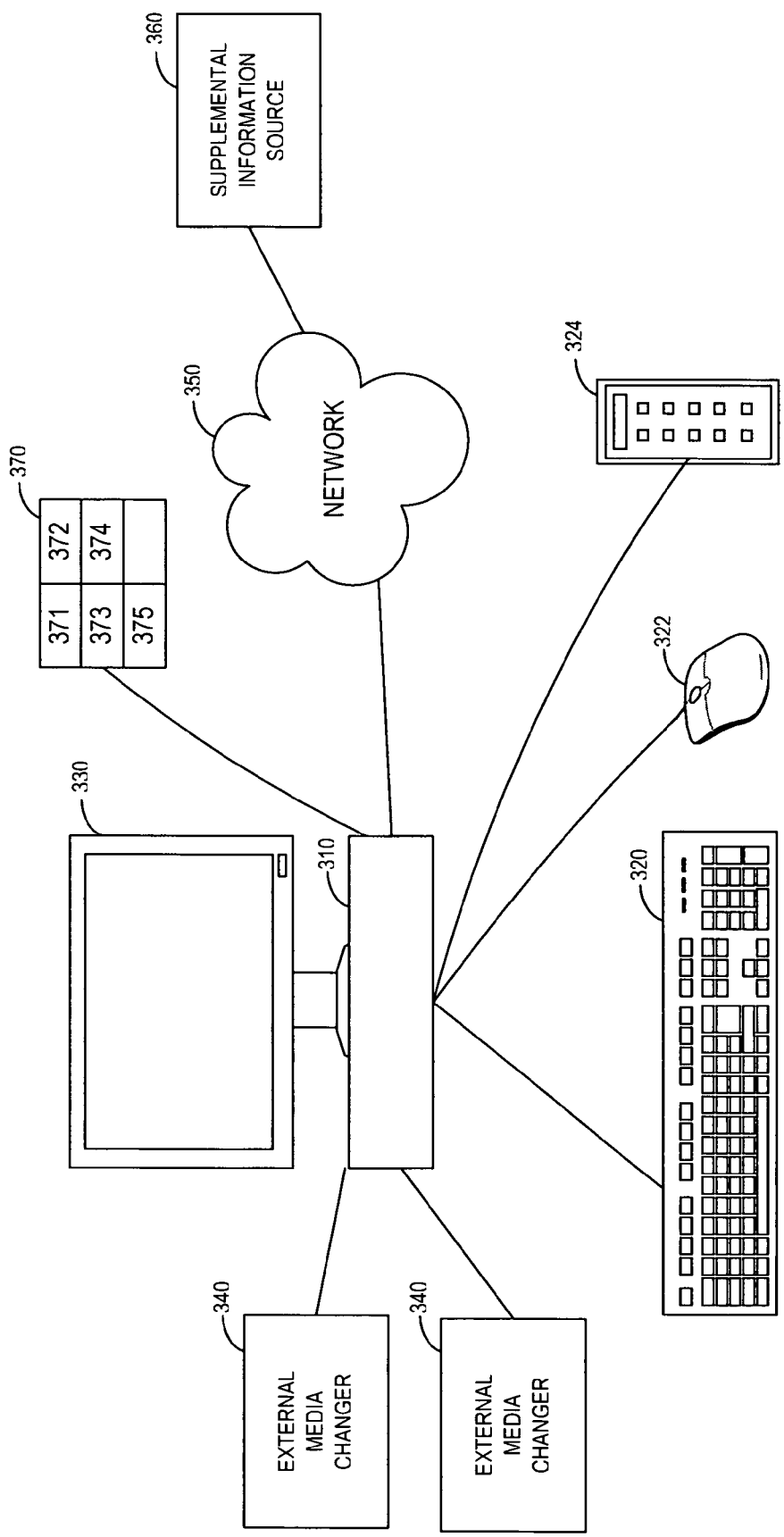
FIG. 3 is a block diagram illustrating an overview of a system in accordance with an embodiment of the invention.

FIG. 3 depicts an example of a system suitable for performing various embodiments of the invention. In FIG. 3, a computer 310 is shown with a variety of available input devices or controllers, including a keyboard 320, a mouse 322, and a remote control 324. Preferably, one or more of these input devices is available for providing input to the computer. The computer 310 is also connected to a monitor or display device 330. The computer 310 can also be connected to one or more external media changers 340. Additionally, computer 310 is connected to a network 350, such as the world-wide web. Via network 350, computer 310 can communicate with one or more external computers 360, which can provide remote services or information.

In the embodiment shown in FIG. 3, computer 310 is operated to perform the functions of a media content organizer 370. The media content organizer 370 includes an identification service 371 for identifying available DVD's in external media changers. Optionally, identification service 371 can also identify DVD's located in playback or storage devices that are internal to or dedicated to computer 310. Media content organizer 370 also includes a data retrieval service 372 for obtaining supplemental information about identified DVD's from an outside service provider. Media content organizer 370 further includes an aggregator for aggregating supplemental information obtained about the identified DVD's. Additionally, media content organizer 370 includes a media presentation service 374 for playing back a DVD that is available to the computer 310, either in an external media changer or in an internal playback device. Media content organizer 370 also contains a navigator 375 for providing a graphical user experience or interface for display of the supplemental information and control of the external media changers.

IV. Controlling an External Changer and Playback Device

In another embodiment, an application program interface is provided to allow control of the external disc changer and playback device. The application program interface provides the commands for manipulating the external disc changer, such as commands for loading a disc into the playback device, unloading a disc from the playback device, opening the changer to allow addition or removal of a disc, and playback of the disc.

In an embodiment, a top level Media Changer interface can be used to control an external DVD changer and/or playback device. In such an embodiment, the MediaChanger interface can expose the following properties for use by other applications: A) DriveDiscData—Gets information about the discs in the drives, as further described below; B) IsLocked—Specifies whether the media changer is currently locked by any application; and C) SlotDiscData—Gets information about the discs in slots, as further described below.

The Media Changer interface can also expose the following methods for use by other applications: A) EjectDisc—Ejects the disc from the specified slot; B) LoadDisc—Loads the disk in the specified slot into the specified drive; C) Lock—Locks the media changer for use by this application only; D) RescanDisc—Causes Media Center to rescan the disc in the specified drive; E) UnloadDisc—Unloads the disc in the specified drive; F) Unlock—Unlocks the media changer if this application locked it; and G) PlaybackDisc—Plays back the content contained on the disc in a specified drive.

In another embodiment, a DiscData interface is also provided to enable add-in applications to get information about a disc in a disc changer or playback device. In such an embodiment, the DiscData interface exposes the following properties: A) Address—Gets the index of the changer slot that holds the disc; B) DiscId—Gets the disc identifier; C) DiscType—Gets the disc type; D) DrivePath—Gets the path to the disc drive; E) Properties —Gets properties describing the disc; and F) VolumeLabel—Gets the volume label of the disc. The information provided by the DiscData interface is made available via either the SlotDiscData or DriveDiscData property of the media changer interface.

Figure 4:
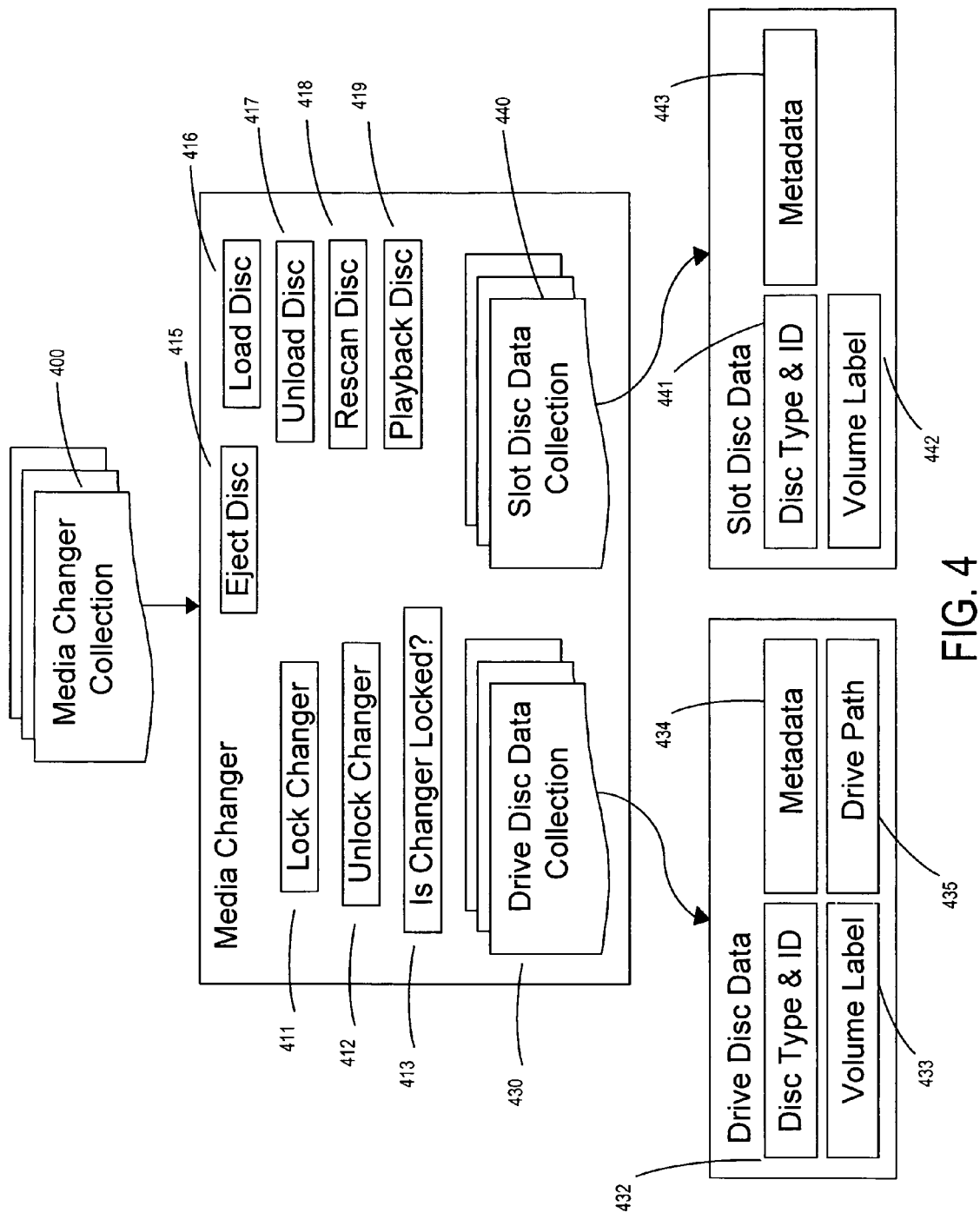
FIG. 4 is a block diagram of an application program interface according to an embodiment of the invention.

FIG. 4 shows an example of the organization of an application program interface according to an embodiment of the invention. In the embodiment depicted in FIG. 4, a Media Changer API 400 includes methods for locking a changer 411, unlocking a changer 412, verifying lock status of a changer 413, ejecting a disc 415, loading a disc 416, unloading a disc 417, rescanning a disc 418, and playing back a disc 419. Media Changer API 400 also includes a Drive Disc Data Collection API 430. The Drive Disc Data Collection API provides methods for retrieval and/or storage of information for disc type and ID 432, volume label 433, metadata 434, and drive path 435. Media Changer API 400 further includes a Slot Disc Data Collection API 440. The Slot Disc Data Collection API provides methods for retrieval and/or storage of information for disc type and ID 442, volume label 443, and metadata 444.

In an embodiment, the Properties property of the DiscData interface can provide for a Movie DVD the properties of Director, Title, ReleaseDate, MPAARating, and Duration. In another embodiment, other properties could be made available, depending on the content of the disc. In an embodiment, the DiscType can be a DVD, an audio CD, a data CD, a blank DVD, a blank CD, an invalid disc that is unreadable, an unknown disc that has not been checked or scanned to determine a DiscType, or empty.

The application program interfaces can be used to control a variety of external media changers. In a preferred embodiment, an external media changer can expose the drives, changers, and other functionality within the media changer as a known or standard type of optical drive, such as a standard Windows optical drive.

In another embodiment, the application program interfaces are used to control an external media changer that exposes an interface capable of receiving instructions from the application program interfaces. In such an embodiment, the external media changer is capable of receiving instructions to perform a variety of functions. The functions can include: providing product data about the media changer; providing the current status of the media changer; providing the current status for some or all of the elements in the media changer; initializing some or all of the elements in the media changer; moving a disc within the changer; and providing volume tag information about one or more requested changer elements. The media changer should also be able to provide information about the parameters of the changer. These parameters for the media changer should indicate whether the changer has the following features: using non-volatile memory for status information; having the capability to position the disc transport mechanism to a particular location and/or element; whether a drive can be used independently for storage of a disc without reading the disc; whether a media changer supports volume identification; and whether the volume information can be replaced. Additionally, the parameters should allow a changer to indicate whether a disc can be moved from a given storage slot to an IEport; from a storage slot to a drive; from an IEport to a storage slot; and from a drive to a storage slot. The parameters should also allow a media changer to indicate whether the changer can position its transport to a particular element, such as a storage slot, drive, or IEport. In an embodiment, the various types of information provided by the media changer can be received by the application program interface for using performing actions on the media changer.

In still another embodiment, the application program interfaces are used to control an external media changer that exposes an interface capable of receiving the following Microsoft Windows control codes, or control codes that perform equivalent functions:
IOCTL_CHANGER_GET_ELEMENT_STATUS;
IOCTL_CHANGER_GET_PARAMETERS;
IOCTL_CHANGER_GET_PRODUCT_DATA; IOCTL_CHANGER_GET_STATUS;
IOCTL_CHANGER_INITIALIZE_ELEMENT_STATUS;
IOCTL_CHANGER_MOVE_MEDIUM; and
IOCTL_CHANGER_QUERY_VOLUME_TAGS. In such an embodiment, the results from IOCTL_CHANGER_GET_PARAMETERS should indicate values for the following feature flags: CHANGER_STATUS_NON_VOLATILE; CHANGER_POSITION_TO_ELEMENT; CHANGER_STORAGE_DRIVE; CHANGER_VOLUME_IDENTIFICATION; and CHANGER_VOLUME_REPLACE. The results from IOCTL_CHANGER_GET_PARAMETERS should also be able to indicate values for the following movement flags: For movement from a storage slot to another element, CHANGER_TO_IEPORT and CHANGER_TO_DRIVE; For movement from an IEport, CHANGER_TO_SLOT; and for movement from a drive, CHANGER_TO_SLOT. The results from IOCTL_CHANGER_GET_PARAMETERS should further be able to indicate values for the following position flags: CHANGER_TO_SLOT; CHANGER_TO_IEPORT; and CHANGER_TO_DRIVE.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for organizing media content, comprising:
   identifying, by a first computing process, one or more media discs stored on an external media changer;
   retrieving, by a second computing process, supplemental information corresponding to each identified media disc;
   displaying cover art, by a third computing process, of at least a first media disc of the identified media discs in an aggregated gallery comprised of a cover art associated with the first media disc, wherein the cover art, when displayed as part of the aggregated gallery, is a selectable link to provide additional supplemental information for at least a second media disc of the identified media discs, the first media disc and the second media disc are different media discs;
   in response to a user selecting the cover art for the first media disc from the aggregated gallery, displaying, in a second gallery, at least a portion of the supplemental information for the second media disc, wherein the at least a portion of the supplemental information for the second media disc is comprised of a cover art associated with the second media disc; and
   the first computing process, the second computing process, and the third computing process are performed by one or more computing devices.

2. The method of claim 1, wherein the retrieving step further comprises retrieving supplemental information, including cover art, from a remote source.

3. The method of claim 1, wherein the identifying step further comprises determining at least one identifier for the first media disc.

4. The method according to claim 1, further comprising navigating through the displayed supplemental information.

5. The method according to claim 1, wherein the identifying step further comprises determining at least one of: a number, a type, or other identifiers associated to the first media disc.

6. The method according to claim 1, wherein the retrieving step further comprises forwarding media identification information to an outside service provider.

7. The method according to claim 1, further comprising aggregating information corresponding to media contained in one or more external media sources.

8. The method according to claim 1, wherein at least a portion of the supplemental information is stored locally for a fixed period of time.

9. The method according to claim 1, wherein the retrieving step further comprises displaying at least a portion of the supplemental information each time the supplemental information is retrieved.

10. A media content organizer, comprising:
    an identification service that determines an identifier for at least one media content disc in an external media changer;
    a data retrieval service that retrieves supplemental information, including cover art, corresponding to one or more identified media content discs; and
    a media presentation service that displays, on a display device, an aggregated gallery and a second gallery, the aggregated gallery is comprised of a cover art graphical representation of a first media content disc, the second gallery, which is displayed in response to a selection of the cover art graphical representation of the first media content disc from the aggregate gallery, is comprised of cover art for a second media content disc, the second media content disc is related to, but different from, the first media content disc, such that the first media content disc and the second media content disc are media of a similar content type.

11. The system according to claim 10, wherein the identification service determines at least one of: a number, a type, or other identifiers for a media source.

12. The system according to claim 10, further comprising an aggregator that aggregates information corresponding to media information contained in the external media changer.

13. The system according to claim 10, further comprising one or more external media sources that provide media content.

14. The system according to claim 10, wherein the data retrieval service forwards identification information to an outside service provider and receives the supplemental information.

15. The system according to claim 10, wherein the second gallery displays cover art in a scrolling format for the second media content disc.

16. The system according to claim 10, wherein the display device displays a series of aggregate gallery screens that a user can navigate between, wherein each aggregate gallery screen includes a subset of the at least one media disc.

17. The system according to claim 10, wherein the cover art is a menu link to one or more actions.

18. The system of claim 10, wherein the second gallery is further comprised of:
    a top-level gallery that displays a first portion of supplemental data for the second media content disc; and
    a second-level gallery that displays a second portion of the supplemental data for the second media content disc.

19. One or more computer-readable storage memories having computer-executable instructions embodied thereon, that when executed perform a method for organizing media content, the method comprises:
    identifying one or more media content discs having video content embodied thereon, the one or more media content discs are stored on an external media changer, wherein the one or more media content discs are identified by identifying information;
    retrieving supplemental information, including cover art, corresponding to each identified media content disc of the one or more media content discs, wherein the supplemental information is retrieved from an external source based on the identifying information;

displaying a first portion of the supplemental information corresponding to a first media content item of the identified media content discs in a first-level gallery, wherein the first portion of supplemental information includes cover art configured with a menu to a second-level gallery associated with a second media content item of the identified media content discs, such that the first media content item and the second media content item are different content items having a similar content type; and displaying a second portion of the supplemental information in the second-level gallery corresponding to a selected cover art menu link for the first content item from the first portion of the supplemental information, wherein the second-level gallery includes cover art for the second media content item.

* * * * *